(12) United States Patent
Kim

(10) Patent No.: US 7,830,477 B2
(45) Date of Patent: Nov. 9, 2010

(54) LIQUID CRYSTAL DISPLAY DEVICE

(75) Inventor: Dong-gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 266 days.

(21) Appl. No.: 11/931,619

(22) Filed: Oct. 31, 2007

(65) Prior Publication Data

US 2008/0136992 A1   Jun. 12, 2008

(30) Foreign Application Priority Data

Dec. 12, 2006   (KR)  ............... 10-2006-0126542

(51) Int. Cl.
*G02F 1/1335* (2006.01)
(52) U.S. Cl. ............... 349/108; 349/106; 349/107; 349/109
(58) Field of Classification Search ............ 349/10–109
See application file for complete search history.

(56) References Cited

U.S. PATENT DOCUMENTS

| | | | |
|---|---|---|---|
| 5,444,557 A * | 8/1995 | Spitzer et al. | 349/42 |
| 5,781,262 A * | 7/1998 | Suzuki et al. | 349/128 |
| 6,081,314 A * | 6/2000 | Suzuki et al. | 349/129 |
| 6,323,922 B1 * | 11/2001 | Suzuki et al. | 349/110 |
| 6,365,916 B1 * | 4/2002 | Zhong et al. | 257/59 |
| 6,697,138 B2 * | 2/2004 | Ha et al. | 349/114 |
| 7,227,185 B2 * | 6/2007 | Lin | 257/59 |
| 7,394,510 B2 * | 7/2008 | Oh et al. | 349/106 |
| 2002/0113927 A1 * | 8/2002 | Ha et al. | 349/113 |
| 2005/0078252 A1 * | 4/2005 | Lin | 349/139 |
| 2006/0164352 A1 * | 7/2006 | Yoo et al. | 345/87 |

* cited by examiner

*Primary Examiner*—K. Cyrus Kianni
(74) *Attorney, Agent, or Firm*—Cantor Colburn LLP

(57) ABSTRACT

A liquid crystal display device includes; a first substrate, a second substrate facing the first substrate and having a common electrode, and a liquid crystal layer, the first substrate including; a plurality of pixels, a thin film transistor, a pixel electrode, a color filter including a first sub color filter, a second sub color filter and a third sub color filter, each sub color filter including a different color, and a shield electrode receiving a common voltage and disposed substantially parallel to the data line along a boundary between adjacent pixels on the color filter, wherein the color filter disposed below the shield electrode comprises a convex region which protrudes toward the second substrate, the plurality of pixels comprise a first pixel having the first sub color filter, a second pixel having the second sub color filter and a third pixel having the third sub color filter, and the third sub color filter forms the convex region.

17 Claims, 23 Drawing Sheets

LIQUID CRYSTAL DISPLAY DEVICE

This application claims priority to Korean Patent Application No. 2006-0126542, filed on Dec. 12, 2006, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display ("LCD") device, and more particularly, to an LCD device which includes a color filter formed in a thin film transistor substrate.

(b) Description of the Related Art

A liquid crystal display ("LCD") device includes a first substrate including a thin film transistor, a second substrate facing the first substrate and a liquid crystal layer interposed between the first substrate and the second substrate.

The LCD device displays images by applying electric fields to the liquid crystal layer, which changes the orientation of liquid crystal molecules in the liquid crystal layer, which in turn varies the transmittance of light through the liquid crystal layer. The LCD device may then generate an image by using a plurality of pixels each of which are capable of varying the transmittance of light through a portion of the LCD device.

The LCD may display moving images by rapidly displaying a series of images. Each image in the series is called a frame. A human observer perceives the series of rapidly changing images as motion.

Recently, LCD devices have employed a color filter on array ("CFOA") type of color filter wherein a color filter is formed on the first substrate. In LCD devices utilizing the CFOA type of color filter, color filters including different colors contact each other on boundaries between pixels of the LCD device.

The color filters contacting each other on the boundaries overlap or are spaced apart from each other, thereby creating a non-uniform cell gap on the boundaries between the pixels.

A pixel electrode is not typically formed on the boundaries between the pixels and therefore liquid crystals disposed on the boundaries sustain an initial alignment and are not affected by changes in the electric fields of surrounding pixels. The liquid crystals disposed on the boundaries are aligned at an inclination due to the non-uniform cell gap.

Some of light incident to the liquid crystals disposed on the boundaries between the pixels is emitted to the outside through the inclined liquid crystals. The light leakage causes contrast ratio reduction and also causes black color coordinates to change.

BRIEF SUMMARY OF THE INVENTION

Accordingly, it is an aspect of the present invention to provide a liquid crystal display device which reduces or effectively prevents problems caused by light leakage.

Additional aspects and/or advantages of the present invention will be set forth in part in the description which follows and, in part, will be obvious from the description, or may be learned by practice of the present invention.

An exemplary embodiment of a liquid crystal display ("LCD") device includes; a first substrate, a second substrate which includes a common electrode and faces the first substrate, and a liquid crystal layer disposed between the first substrate and the second substrate, the first substrate including; a plurality of pixels, each pixel being connected to a data line and a gate line, a thin film transistor electrically connected to the data line and the gate line, a pixel electrode electrically connected to the thin film transistor, a color filter which includes a first sub color filter, a second sub color filter and a third sub color filter, each of the first, second and third sub color filters including a different color, and a shield electrode which receives a common voltage and is disposed substantially parallel to the data line along a boundary between adjacent pixels on the color filter, wherein the color filter disposed below the shield electrode includes a convex region which protrudes toward the second substrate, the plurality of pixels include a first pixel including the first sub color filter, a second pixel including the second sub color filter and a third pixel including the third sub color filter, and the third sub color filter forms the convex region between the first sub color filter and the second sub color filter on a first boundary between the first pixel and the second pixel along the data line.

According to an exemplary embodiment of the present invention, the third sub color filter forms the convex region on a second boundary between the second pixel and the third pixel along the data line, and forms the convex region on a third boundary between the first pixel and the third pixel along the data line.

According to an exemplary embodiment of the present invention, the first sub color filter and the second sub color filter are spaced apart from each other with respect to the first boundary.

According to an exemplary embodiment of the present invention, the first sub color filter is a red color, the second sub color filter is a green color and the third sub color filter is a blue color.

According to an exemplary embodiment of the present invention, the thin film transistor includes a first thin film transistor and a second thin film transistor, and the pixel electrode includes a first pixel electrode electrically connected to the first thin film transistor and a second pixel electrode separated from the first pixel electrode and is electrically connected to the second thin film transistor.

According to an exemplary embodiment of the present invention, the first thin film transistor and the second thin film transistor are connected to the same gate line.

According to an exemplary embodiment of the present invention, the data line includes a first data line connected to the first thin film transistor and a second data line connected to the second thin film transistor.

According to an exemplary embodiment of the present invention, the pixel electrode includes a pixel electrode cutting pattern, the common electrode includes a common electrode cutting pattern, and the liquid crystal layer is configured in a vertical alignment ("VA") mode.

According to an exemplary embodiment of the present invention, the shield electrode at least partially covers the first and second data lines.

According to an exemplary embodiment of the present invention, the shield electrode is disposed in substantially the same layer as the pixel electrode.

According to an exemplary embodiment of the present invention, the first substrate further includes a light blocking layer disposed on the boundaries between the pixels along the data line.

According to an exemplary embodiment of the present invention, the light blocking layer is in a floating state.

According to an exemplary embodiment of the present invention, a center point of the light blocking layer along a direction substantially parallel to the gate line is disposed closer to one of the first data line and the second data line.

According to an exemplary embodiment of the present invention, the light blocking layer is disposed on the first boundary with the center point closer to the second pixel.

According to an exemplary embodiment of the present invention, the light blocking layer is disposed on the second boundary with the center point closer to the second pixel.

According to an exemplary embodiment of the present invention, the light blocking layer is disposed on the third boundary with the center point closer to the first pixel.

According to an exemplary embodiment of the present invention, the light blocking layer is disposed in substantially the same layer as the gate line.

An exemplary embodiment of an LCD device includes; a first substrate, a second substrate which includes a common electrode and faces the first substrate, and a liquid crystal layer disposed between the first substrate and the second substrate, the first substrate including; a plurality of pixels, each pixel being connected to a data line and a gate line, a thin film transistor electrically connected to the data line and the gate line, a pixel electrode electrically connected to the thin film transistor, a color filter which includes a first sub color filter, a second sub color filter and a third sub color filter, each of the first, second and third sub color filters including a different color, a shield electrode which receives a common voltage and is disposed substantially parallel to the data line along a boundary between adjacent pixels on the color filter, and a light blocking layer disposed on the boundary between the pixels along the data line.

According to an exemplary embodiment of the present invention, the light blocking layer is disposed in substantially the same layer as the gate line and is in a floating state.

According to an exemplary embodiment of the present invention, the first sub color filter is a red color, the second sub color filter is a green color and the third sub color filter is a blue color, the pixel includes a first pixel including the first sub color filter, a second pixel including the second sub color filter, and a third pixel including the third sub color filter, the light blocking layer includes a center point along a direction substantially parallel to the gate line, the center point is disposed closer to the second pixel on a first boundary between the first pixel and the second pixel along the data line.

According to an exemplary embodiment of the present invention, the light blocking layer is disposed on a second boundary between the second pixel and the third pixel along the data line with the center point closer to the second pixel.

According to an exemplary embodiment of the present invention, the light blocking layer is disposed on a third boundary between the first pixel and the third pixel along the data line with the center point closer to the second pixel.

According to an exemplary embodiment of the present invention, the color filter disposed below the shield electrode includes a convex region which protrudes toward the second substrate, and the third sub color filter forms the convex region between the first sub color filter and the second sub color filter on a first boundary between the first pixel and the second pixel along the data line.

According to an exemplary embodiment of the present invention, the first sub color filter is a red color, the second sub color filter is a green color, and the third sub color filter is a blue color.

According to an exemplary embodiment of the present invention, the third sub color filter forms the convex region on a second boundary between the second pixel and the third pixel along the data line, and forms the convex region on a third boundary between the first pixel and the third pixel along the data line.

According to an exemplary embodiment of the present invention, the thin film transistor includes a first thin film transistor and a second thin film transistor, and the pixel electrode includes a first pixel electrode electrically connected to the first thin film transistor and a second pixel electrode separated from the first pixel electrode and electrically connected to the second thin film transistor.

According to an exemplary embodiment of the present invention, the first thin film transistor and the second thin film transistor are connected to the same gate line, and the data line includes a first data line connected to the first thin film transistor and a second data line connected to the second thin film transistor.

According to an exemplary embodiment of the present invention, a center point of the light blocking layer along a direction substantially parallel to the gate line is disposed closer to one of the first data line and the second data line.

According to an exemplary embodiment of the present invention, the pixel electrode includes a pixel electrode cutting pattern, the common electrode includes a common electrode cutting pattern, and the liquid crystal layer is configured in a VA mode.

According to an exemplary embodiment of the present invention, the shield electrode is disposed in substantially the same layer as the pixel electrode, and at least partially covers the first and second data lines.

An exemplary embodiment of an LCD device includes; a first substrate, a second substrate which includes a common electrode and faces the first substrate, and a liquid crystal layer disposed between the first substrate and the second substrate, the first substrate including; a plurality of pixels, each pixel being connected to a data line and a gate line, a thin film transistor electrically connected to the data line and the gate line, a pixel electrode electrically connected to the thin film transistor, a color filter which includes a first sub color filter, a second sub color filter and a third sub color filter, each of the first, second and third sub color filters including a different color, and a light blocking layer disposed on a boundary between neighboring pixels along the data line, the data line including a first data line disposed on a right side of the pixels and a second data line disposed on a left side of the pixels, and the pixel electrode at least partially covering the first data line and the second data line.

According to an exemplary embodiment of the present invention, the color filter is concave on the boundary between the neighboring pixels along the data line.

According to an exemplary embodiment of the present invention, the thin film transistor includes a first thin film transistor electrically connected to the first data line and a second thin film transistor electrically connected to the second data line, and the pixel electrode includes a first pixel electrode electrically connected to the first thin film transistor and a second pixel electrode separated from the first pixel electrode and electrically connected to the second thin film transistor.

According to an exemplary embodiment of the present invention, the second pixel electrode at least partially surrounds the first pixel electrode, and at least partially covers the first data line and the second data line.

According to an exemplary embodiment of the present invention, the first pixel electrode has a bracket shape.

According to an exemplary embodiment of the present invention, the light blocking layer is disposed in substantially the same layer as the gate line and is in a floating state.

According to an exemplary embodiment of the present invention, a center point of the light blocking layer along a direction substantially parallel to the gate line is disposed closer to one of the first data line and a second data line.

According to an exemplary embodiment of the present invention, the first sub color filter includes a red color, the second sub color filter includes a green color and the third sub color filter includes a blue color, the pixels include a first pixel including the first sub color filter, a second pixel including the second color filter, and a third pixel including the third color filter, and a center point of the light blocking layer along a direction substantially parallel to the gate line is disposed closer to one of the first data line and the second data line.

According to an exemplary embodiment of the present invention, the light blocking layer is disposed on a second boundary between the second pixel and the third pixel along the data line with the center point closer to the second pixel.

According to an exemplary embodiment of the present invention, the light blocking layer is disposed on a third boundary between the first pixel and the third pixel along the data line with the center point closer to the first pixel.

According to an exemplary embodiment of the present invention, the pixel electrode includes a pixel electrode cutting pattern, the common electrode includes a common electrode cutting pattern, and the liquid crystal layer is configured in a VA mode.

BRIEF DESCRIPTION OF THE DRAWINGS

The above and/or other aspects, features and advantages of the present invention will become more apparent and more readily appreciated from the following description of the exemplary embodiments, taken in conjunction with the accompany drawings of which.

DETAILED DESCRIPTION OF THE INVENTION

Figure 1:
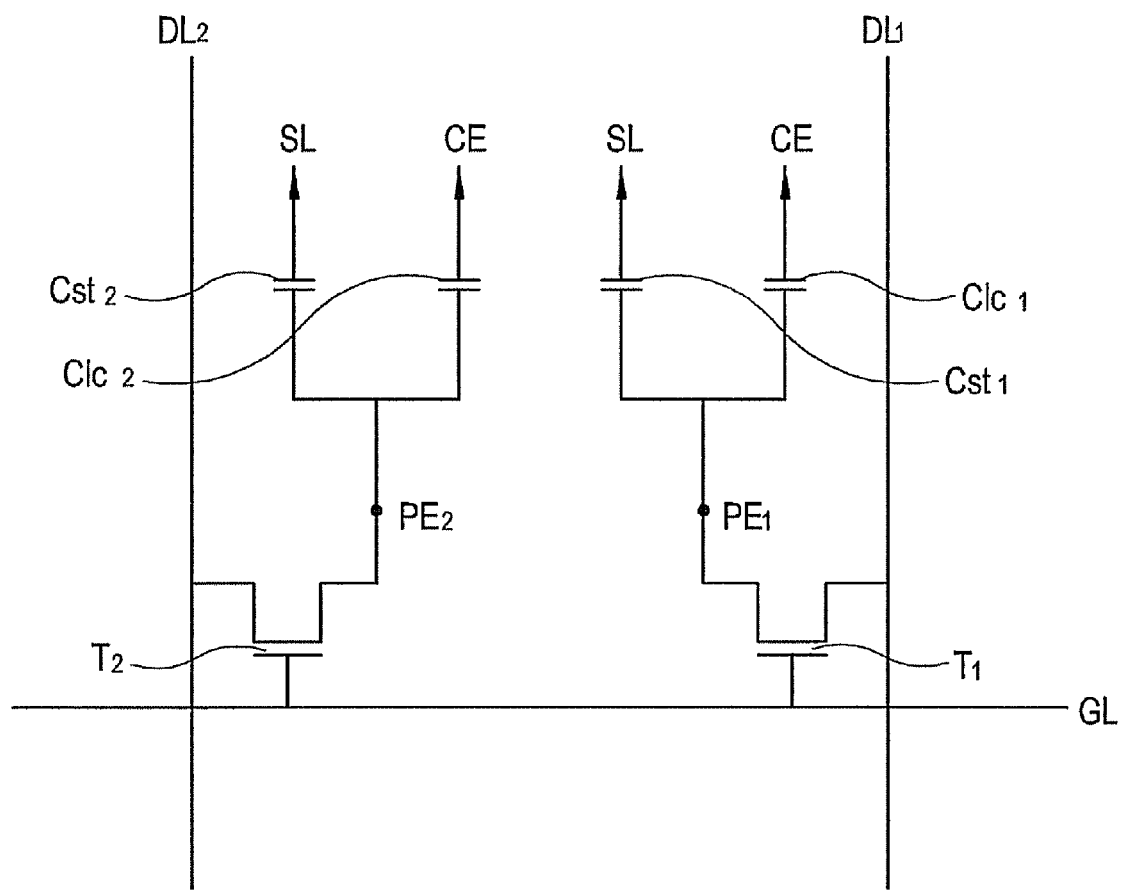
FIG. 1 is an equivalent circuit diagram of an exemplary embodiment of a single pixel in a first exemplary embodiment of a liquid crystal display ("LCD") device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIG. 1 is an equivalent circuit diagram of an exemplary embodiment of a single pixel in first exemplary embodiment of a liquid crystal display ("LCD") device according to the present invention.

A single pixel includes a gate line GL, two data lines DL1 and DL2, and two thin film transistors ("TFTs") T1 and T2.

A first TFT T1 is connected to a first data line DL1 and the gate line GL while a second TFT T2 is connected to a second data line DL2 and the gate line GL.

The TFTs T1 and T2 are connected to the same gate line GL and are driven substantially simultaneously. Meanwhile, the TFTs T1 and T2 are respectively connected to the data lines DL1 and DL2 which may output different signals.

Liquid crystal capacitors $C_{LC1}$ and $C_{LC2}$ and storage capacitors Cst1 and Cst2 are connected to TFTs T1 and T2, respectively. The liquid crystal capacitors $C_{LC1}$ and $C_{LC2}$ are formed between pixel electrodes PE1 and PE2 and a common electrode CE. The storage capacitors Cst1 and Cst2 are formed between the pixel electrodes PE1 and PE2 and a storage electrode line SL.

In the current exemplary embodiment the first pixel electrode PE1 and the second pixel electrode PE2 are separated from each other.

Figure 2:
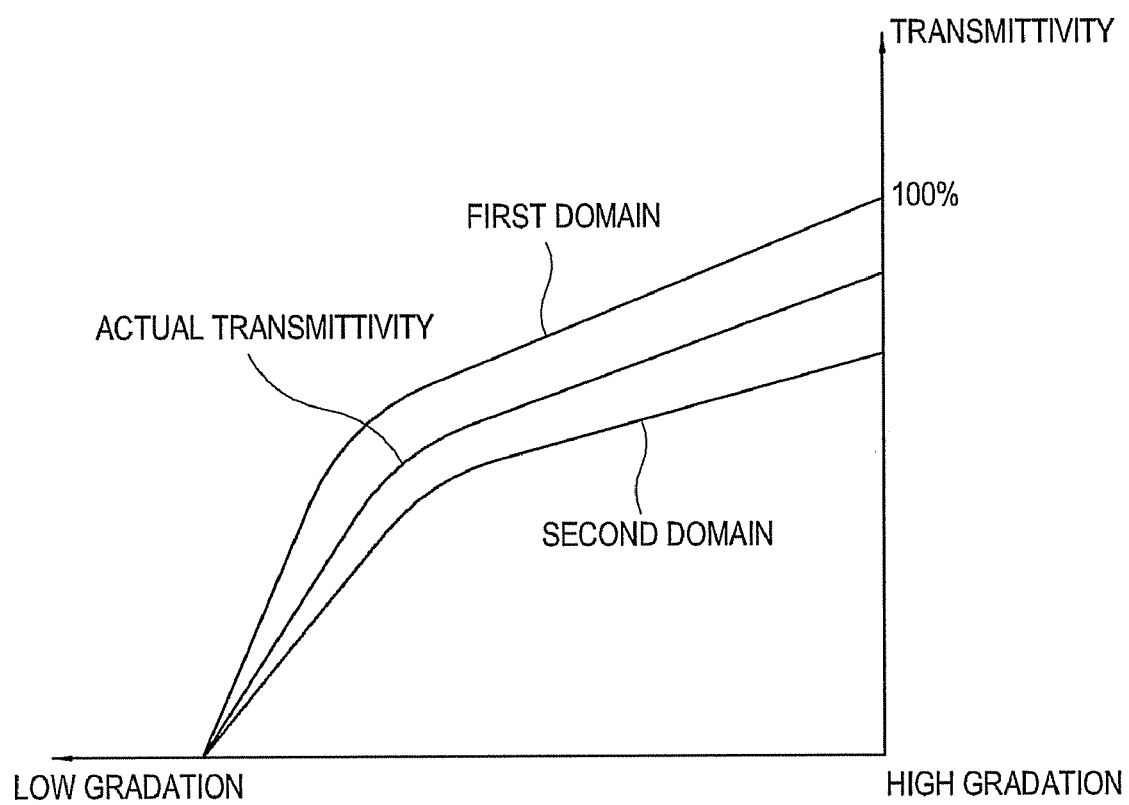
FIG. 2 illustrates a principle of improving visibility in the first exemplary embodiment of an LCD device according to the present invention.
Figure 3:
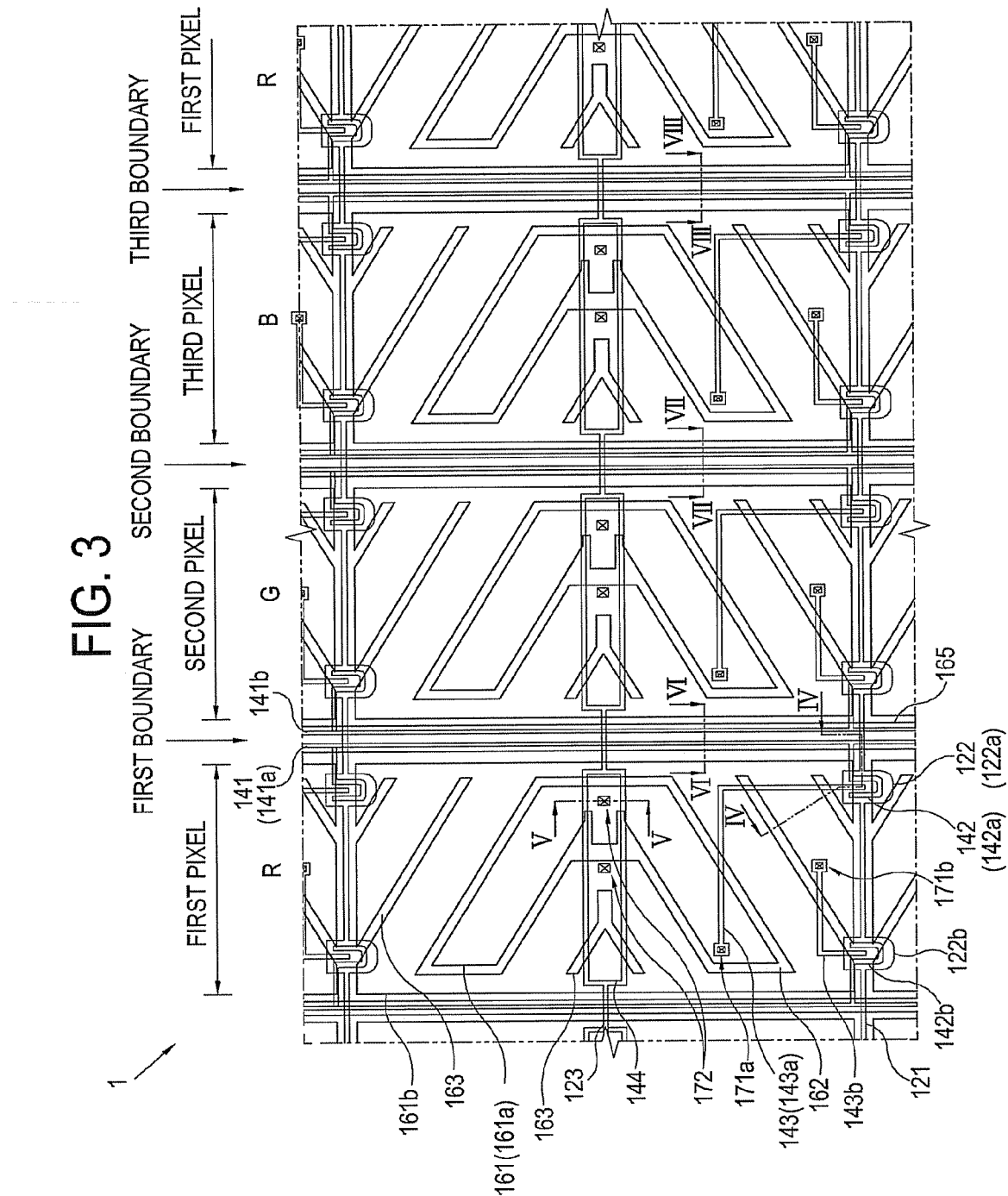
FIG. 3 is a top plan layout view illustrating the first exemplary embodiment of an LCD device according to the present invention.
Figure 4:
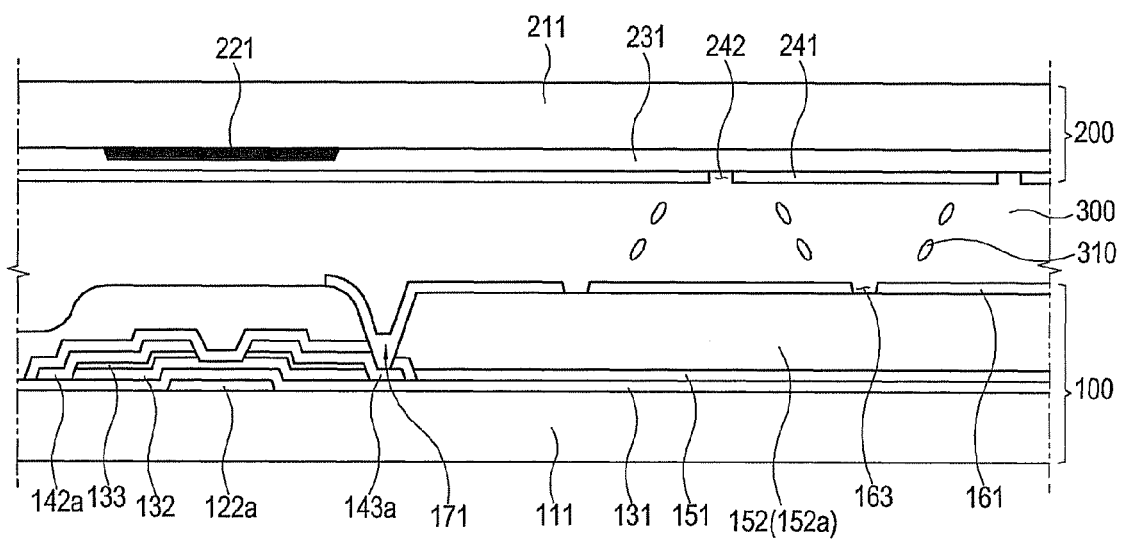
FIG. 4 is a cross-sectional view of the first exemplary embodiment of an LCD device according to the present invention, taken along line IV-IV in FIG. 3.

FIG. 2 illustrates a principle of improving visibility in the first exemplary embodiment of an LCD device according to the present invention.

The first pixel electrode PE1 receives a first data signal through the first TFT T1. Meanwhile, the second pixel electrode PE2 receives a second data signal which is different from the first data signal, through the second TFT T2. That is, the single pixel includes two domains receiving different data signals and displaying correspondingly different transmittances.

In one exemplary embodiment, the brightness of a first domain corresponding to the first pixel electrode PE1 is different from the brightness of a second domain corresponding to the second pixel electrode PE2.

Thus, a plurality of domains which have different gamma curves exists in a single pixel. Variations in the brightness and color in front and lateral sides can be made to compensate for each other, thereby improving lateral visibility.

The first exemplary embodiment of an LCD device according to the present invention will be described with reference to FIGS. 3 to 9. As shown in FIGS. 4 to 9, an LCD device 1 includes a first substrate 100, a second substrate 200 facing the first substrate 100, and a liquid crystal layer 300 formed between the first and second substrates 100 and 200.

The first substrate 100 will be described in more detail below.

Gate wires 121, 122a, 122b and 123 are formed on a first insulating substrate 111. Exemplary embodiments of the gate wires 121, 122a, 122b and 123 may include a single metal layer or multiple layers of various materials. The gate wires 121, 122a, 122b and 123 include a gate line 121 which extends substantially in a transverse direction, gate electrodes 122a and 122b which are connected to the gate line 121, and a storage capacitor line 123 which extends substantially in parallel with the gate line 121 and intersects a center portion of a pixel.

A gate insulating layer 131, exemplary embodiments of which include silicon nitride ("SiNx"), covers the gate wires 121, 122a, 122b and 123.

A semiconductor layer 132, exemplary embodiments of which comprise amorphous silicon ("a-Si"), is formed on the gate insulating layer 131 above the gate electrodes 122a and 122b. An ohmic contact layer 133, exemplary embodiments of which include silicide or n+ hydrogenated amorphous silicon highly doped with an n-type dopant, is formed on the semiconductor layer 132. The ohmic contact layer 133 is removed from a channel between a source electrode 142 and a drain electrode 143.

Data wires 141, 142, 143 and 144 are formed on the ohmic contact layer 133 and the gate insulating layer 131. Exemplary embodiments of the data wires 141, 142, 143 and 144 may also include a single metal layer or multiple layers of various materials. The data wires 141, 142, 143 and 144 include a data line 141 which is formed substantially vertically and crosses the gate line 121, the source electrode 142 which branches from the data line 141 and partly extends to an upper part of the ohmic contact layer 133, the drain electrode 143 which is separated from the source electrode 142 and is partly formed on the ohmic contact layer 133 substantially opposite to the source electrode 142, and a storage capacitor auxiliary layer 144 which is formed on the storage capacitor line 123. In one exemplary embodiment the storage capacitor auxiliary layer 144 is formed as an island.

Each of the TFTs include separate components including a gate electrode 122a, a source electrode 142a and a drain electrode 143a of the first TFT T1, and a gate electrode 122b, a source electrode 142b and a drain electrode 143b of the second TFT T2.

The data line 141 includes a first data line 141a and a second data line 141b. The first TFT T1 is connected to the first data line 141a which is formed on the right side of the pixel while the second TFT T2 is connected to the second data line 141b which is formed on the left side of the pixel.

An insulating layer 151, exemplary embodiments of which include silicon nitride ("SiNx"), is formed on the data wires 141, 142, 143 and 144 and the semiconductor layer 132 which is not covered by the data wires 141, 142, 143 and 144.

A color filter 152 is formed on the insulating layer 151. In the present exemplary embodiment the color filter 152 includes a first sub color filter 152a having a red color, a second sub color filter 152b having a green color, and a third sub color 152c having blue color. Alternative exemplary embodiments include configurations wherein the sub color filters include different colors. A first pixel, a second pixel and a third pixel are arranged sequentially and repeatedly along a direction of extension of the gate line 121. The first sub color filter 152a is formed on the first pixel, the second sub color filter 152b is formed on the second pixel, and the third sub color filter 152c is formed on the third pixel.

Contact holes 171a, 171b and 172 are formed on the color filter 152. The contact holes 171a and 171b expose the drain electrodes 143a and 143b while the contact hole 172 exposes the storage capacitor auxiliary layer 144. The insulating layer 151 is removed from the contact holes 171a, 171b and 172.

Figure 5:
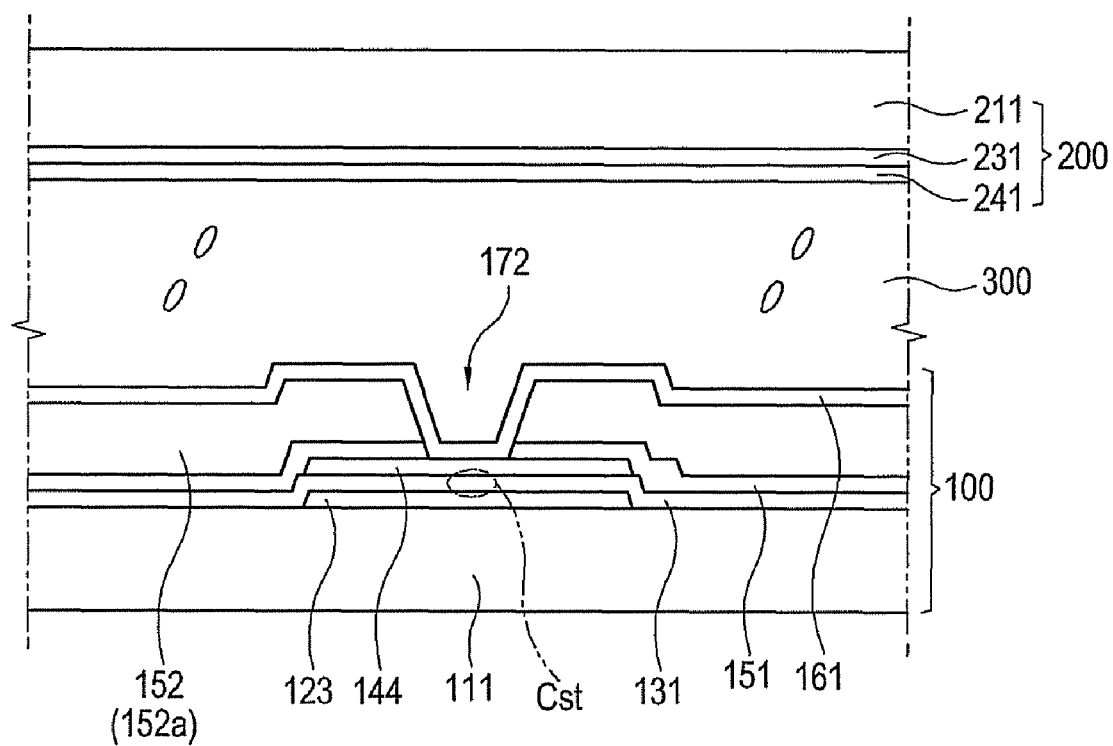
FIG. 5 is a cross-sectional view of the first exemplary embodiment of an LCD device according to the present invention, taken along line V-V in FIG. 3.

As shown in FIG. 5, a pixel electrode 161 is connected to the storage capacitor auxiliary layer 144 through the contact hole 172. A storage capacitor Cst is formed between the storage capacitor auxiliary layer 144 which receives a pixel voltage and the storage capacitor line 123 which receives a common voltage.

The color filter 152 is relatively thick and has a low permittivity to form a capacitor between the pixel electrode 161 and the storage capacitor line 123. The contact hole 172 and the storage capacitor auxiliary layer 144 facilitate the formation of storage capacitor Cst.

The pixel electrode 161 is formed on the color filter 152. The pixel electrode 161 typically includes a transparent conductive material, exemplary embodiments of which include indium tin oxide ("ITO"), indium zinc oxide ("IZO"), and other similar materials. In one exemplary embodiment the pixel electrode 161 is rectangular. Alternative exemplary embodiments include configurations wherein the pixel electrode has other shapes including cutouts or chamfered edges.

The pixel electrode 161 includes a first pixel electrode 161a and a second pixel electrode 161b which are separated from each other by a pixel electrode separating pattern 162. The first pixel electrode 161a has a bracket or "V" shape wherein the pixel electrode 161a has a first branch extending at an angle with respect to the gate line 121 and the data line 141, a base which extends substantially parallel to the data line 141 and is connected to the first branch, and a second branch which is substantially a mirror image of the first branch with respect to an imaginary line running substantially parallel to the gate line 121 and through the center of the base and is connected to the base. The pixel electrode 161a is formed in a center of the pixel. The second pixel electrode 161b surrounds the first pixel electrode 161a.

A pixel electrode cutting pattern 163, which in the current exemplary embodiment is disposed substantially in parallel with the pixel electrode separating pattern 162, is formed on the first pixel electrode 161a and the second pixel electrode 161b.

The first pixel electrode 161a is connected to the first drain electrode 143a of the first TFT T1 through the contact hole 171a. The second pixel electrode 161b is connected to the second drain electrode 143b of the second TFT T2 through the contact hole 171b.

The pixel electrode separating pattern 162 and the pixel electrode cutting pattern 163, together with a common electrode cutting pattern 242 (to be described later) divide the liquid crystal layer 300 into a plurality of sub domains. In the present exemplary embodiment, the sub domains are surrounded by the pixel electrode separating pattern 162, the pixel electrode cutting pattern 163 and the common electrode cutting pattern 242, and the sub domains are elongated in a direction which is substantially diagonal with respect to the gate lines 121 and the data lines 141.

Figure 6:
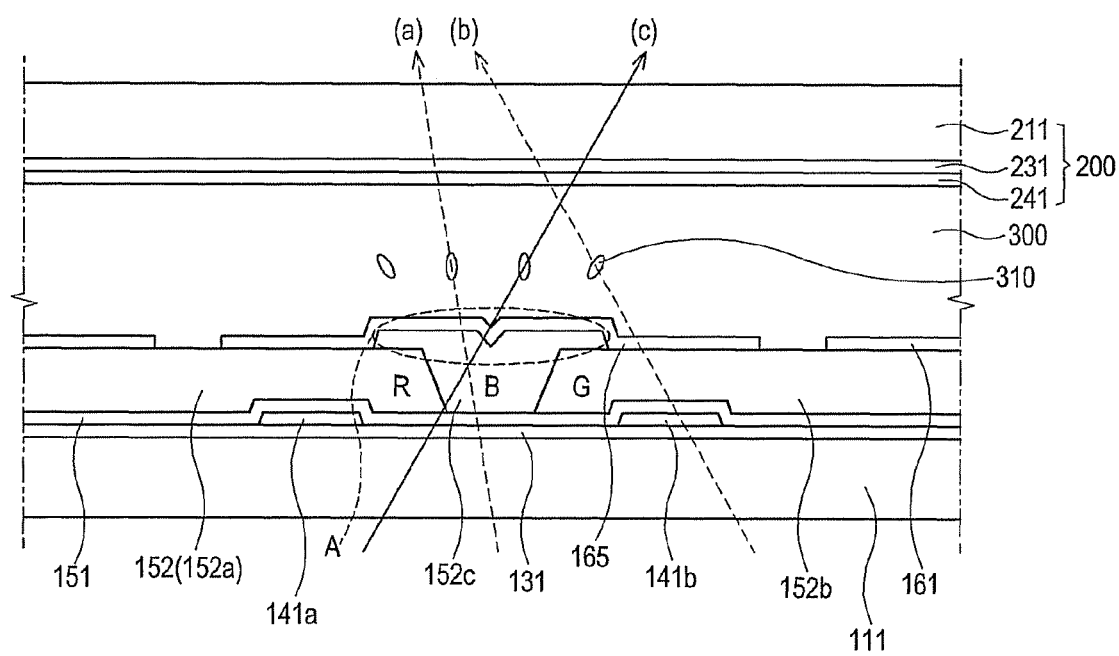
FIG. 6 is a cross-sectional view of the first exemplary embodiment of an LCD device according to the present invention, taken along line VI-VI in FIG. 3.

A shield electrode 165, which is disposed in substantially the same layer as the pixel electrode 161, is formed on boundaries between the respective pixels. As shown in FIG. 6, the shield electrode 165 covers the first data line 141a and the second data line 141b. The pixel electrode 161 is not disposed on the boundaries on which the shield electrode 165 is disposed.

A common voltage is supplied to the shield electrode 165, and thus an electric field is not formed between the shield electrode 165 and a common electrode 241. The liquid crystal layer 300 disposed on the shield electrode 165 is not substantially affected by the data lines 141a and 141b, and therefore sustains an initial alignment.

Hereinafter, the second substrate 200 will be described in more detail.

A black matrix 221 is formed on a second insulating substrate 211. The black matrix 221 blocks light from being directly emitted to the TFTs T1 and T2 of the first substrate 100. In one exemplary embodiment the black matrix 221 may comprise a photosensitive organic material including a black pigment. In one exemplary embodiment the black pigment may include carbon black or titanium oxide.

The black matrix 221 is not formed above the data line 141. Thus, light may be emitted to outside of the second substrate 200 through the shield electrode 165.

In another exemplary embodiment, two or more sub color filters 152a, 152b and 152c are formed on TFTs T1 and T2, and in such an exemplary embodiment a black matrix 221 is not formed on a second substrate 200.

An overcoat layer 231 is formed on the second insulating layer 211 and the black matrix 221. The overcoat layer 231 provides a planar surface for the deposition of additional layers. In alternative exemplary embodiments the overcoat layer 231 may be excluded.

The common electrode 241 is formed on the overcoat layer 231. The common electrode 241 includes a transparent conductive material, exemplary embodiments of which include indium tin oxide ("ITO"), indium zinc oxide ("IZO"), and various other similar materials. The common electrode 241 supplies a voltage to the liquid crystal layer 300, together with the pixel electrode 161 of the TFT substrate.

The common electrode cutting pattern 242 is formed on the common electrode 241. The common electrode cutting pattern 242 is formed substantially in parallel with the pixel electrode separating pattern 162 and the pixel electrode cutting pattern 163.

The pixel electrode separating pattern 162, the pixel electrode cutting pattern 163 and the common electrode cutting pattern 242 are not limited to those shown in the first exemplary embodiment. Alternative exemplary embodiments include configurations wherein the pixel electrode separating pattern 162, the pixel electrode cutting pattern 163 and the common electrode cutting pattern 242 may be formed in various shapes.

The liquid crystal layer 300 is disposed between the first and second substrates 100 and 200. In the present exemplary embodiment the liquid crystal layer 300 employs a vertically aligned ("VA") mode, in which a lengthwise direction of a liquid crystal molecule is substantially perpendicular to the substrates 100 and 200 when an electric field is not applied thereto.

When an electric field is applied to the VA mode liquid crystal layer 300, the liquid crystal molecules lie in a vertical direction with respect to an electric field due to negative dielectric anisotropy. If the pixel electrode separating pattern 162, the pixel electrode cutting pattern 163 and the common electrode cutting pattern 242 are not formed, the liquid crystal molecules are irregularly arranged in various directions. This creates a demarcation line on a boundary between areas having different arrangement directions.

The pixel electrode separating pattern 162, the pixel electrode cutting pattern 163 and the common electrode cutting pattern 242 form a fringe field and determine the direction of the liquid crystal alignment when an electric field is applied to the liquid crystal layer 300. The liquid crystal layer 300 is divided into a plurality of sub domains by the arrangement of the pixel electrode separating pattern 162, the pixel electrode cutting pattern 163 and the common electrode cutting pattern 242.

Light leaks from the boundaries between the pixels substantially in parallel with the data line 141 in the first exemplary embodiment, which will be described in more detail with reference to FIG. 6.

A convex region A is formed where the sub color filters 152a, 152b and 152c overlap each other on the boundaries between the pixels. The overlapping prevents the shield electrode 165 and the data line 141 from being short-circuited and prevents the shield electrode 165 from being electrically affected by the data line 141. The arrangement of the sub color filters 152a, 152b and 152c will be discussed in more detail below.

A liquid crystal molecule 310 is obliquely aligned at an end part of the convex region A. In a black, or minimal light transmittance, mode, light (a) which is incident along a longer axis of the liquid crystal molecule 310 is not emitted to the outside. Meanwhile in the same black mode, light (b) which is incident along a shorter axis of the liquid crystal 310 may be emitted to the outside. Part of light (c) which is incident to the liquid crystal layer 300 along a slanting direction may also be emitted to the outside. Both lights b and c are problematic for displaying a truly black display in a black mode.

The liquid crystal 310 disposed on the shield electrode 165 is not controlled by the electric fields generated in the surrounding pixels, thereby lowering a contrast ratio of the LCD device and changing color coordinates of a black color of the LCD device if light is emitted through the liquid crystal 310 disposed on the shield electrode 165.

The contrast ratio and changing color coordinate problems due to light leakage are reduced or effectively prevented by arranging the color filter 152 in accordance with the first exemplary embodiment of an LCD device, which will be described with reference to FIGS. 6 to 8.

FIG. 6 illustrates a first boundary between the first pixel and the second pixel. A width of the convex region A is substantially large enough so that an end of the convex region A is adjacent to the data lines 141a and 141b. The liquid crystal molecule 310 which is inclined with respect to the first insulating substrate 111 is disposed close to the data lines 141a and 141b. The gate lines 141a and 141b thereby block the light (b) which would otherwise pass through the shorter axis of the liquid crystal 310. That is, the light (b) which is incident to the shorter axis of the inclined liquid crystal 310 is blocked by the data lines 141a and 141b.

Even with the adjustment of the width of the convex region A, total prevention of light leakage is difficult due to the light (c). However, the current exemplary embodiment of the present invention substantially reduces the problems caused by residual light leakage by changing what little light is emitted from the boundaries between the pixels to the outside into a colored light. In one exemplary embodiment, the residual light leakage is colored blue, however alternative exemplary embodiments include configurations wherein the residual light leakage is tinted in various colors.

As shown in FIG. 6, the convex region A includes the third sub color filter 152c having a blue color on the first boundary. The first color filter 152a and the second color filter 152b are spaced apart from each other. With such a configuration, the light (c) which is obliquely incident to the liquid crystal layer 300 is tinted blue when being emitted to the outside through the third sub color filter 152b.

Among green, red and blue colors presented by the respective pixels, green color is the most visible to a user and the blue color is the least visible. The problems caused by the light leakage are reduced by changing the residual light emitted from the first boundary to the outside, into blue light, the least visible one of the three colors presented by the respective pixels.

Figure 7:
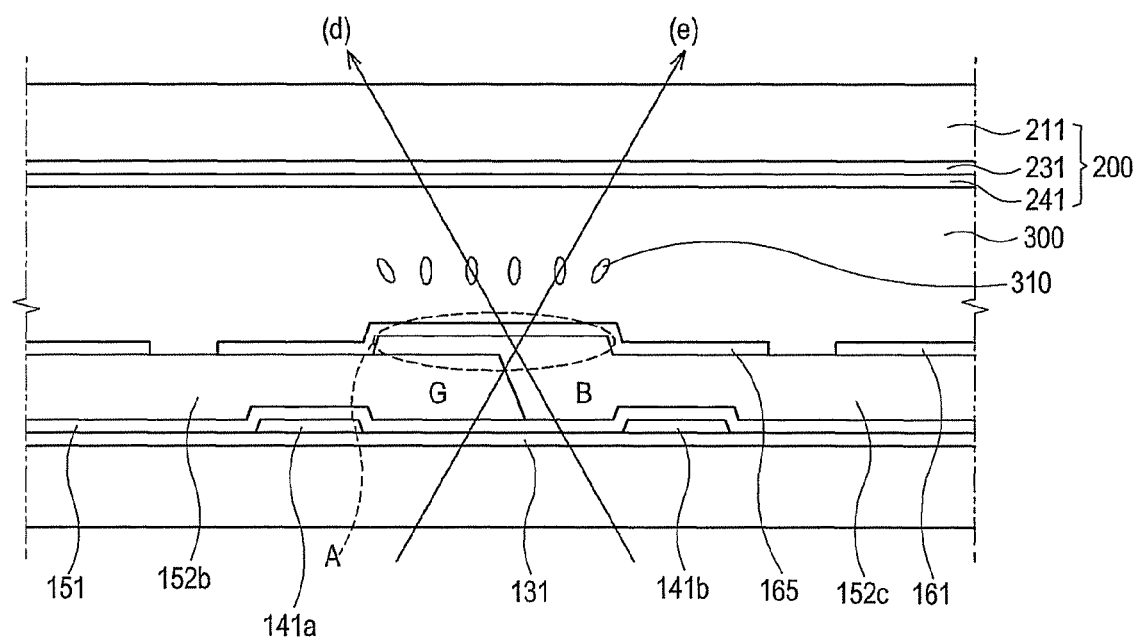
FIG. 7 is a cross-sectional view of the first exemplary embodiment of an LCD device according to the present invention, taken along line VII-VII in FIG. 3.

FIG. 7 illustrates a second boundary between the second pixel and the third pixel. In the second boundary, an end of the convex region A is adjacent to the data lines 141a and 141b.

The convex region A on the second boundary includes the third sub color filter 152c having a blue color. Thus, most of light (d) and (e) which are emitted to the outside becomes blue light or have a substantially blue hue.

Figure 8:
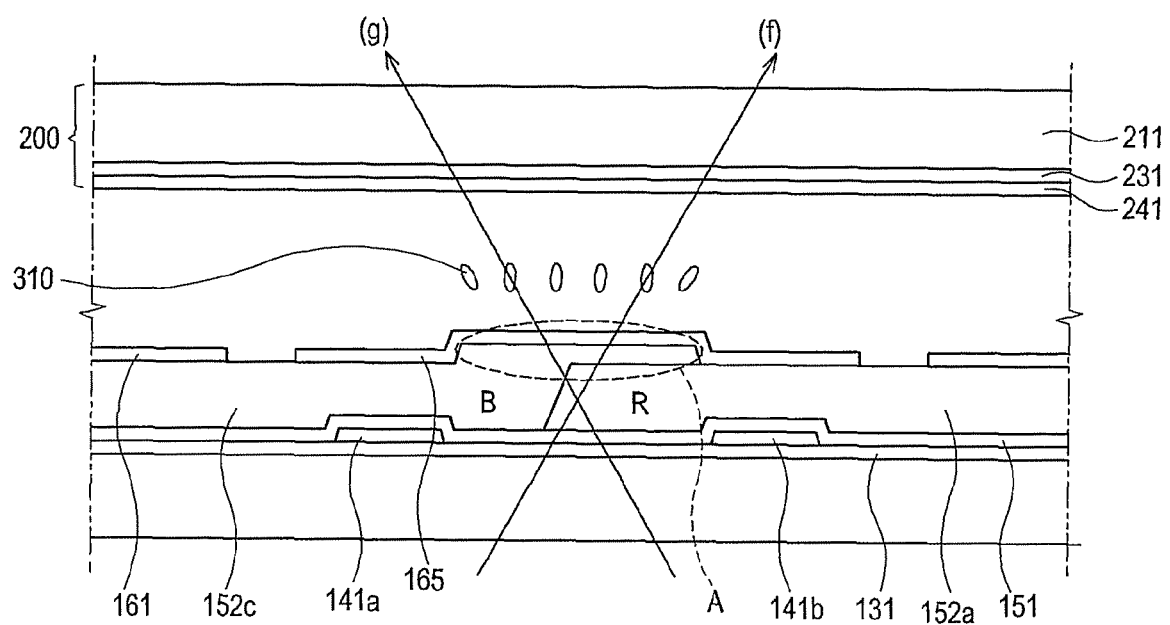
FIG. 8 is a cross-sectional view of the first exemplary embodiment of an LCD device according to the present invention, taken along line VIII-VIII in FIG. 3.

FIG. 8 illustrates a third boundary between the third pixel and the first pixel. An end of the convex region A is adjacent to the data lines 141a and 141b on the third boundary.

The convex region A on the third boundary includes the third sub color filter 152c having a blue color. Thus, most of light (g) and (f) which are emitted to the outside becomes blue light or have a substantially blue hue.

As described above, the first exemplary embodiment of an LCD device according to the present invention leaks less light through the boundary region between pixels by adjusting the width of the convex region A, and the problems caused by the residual light leakage are reduced or effectively eliminated by changing the light emitted to the outside into the blue colored light.

Figure 9:
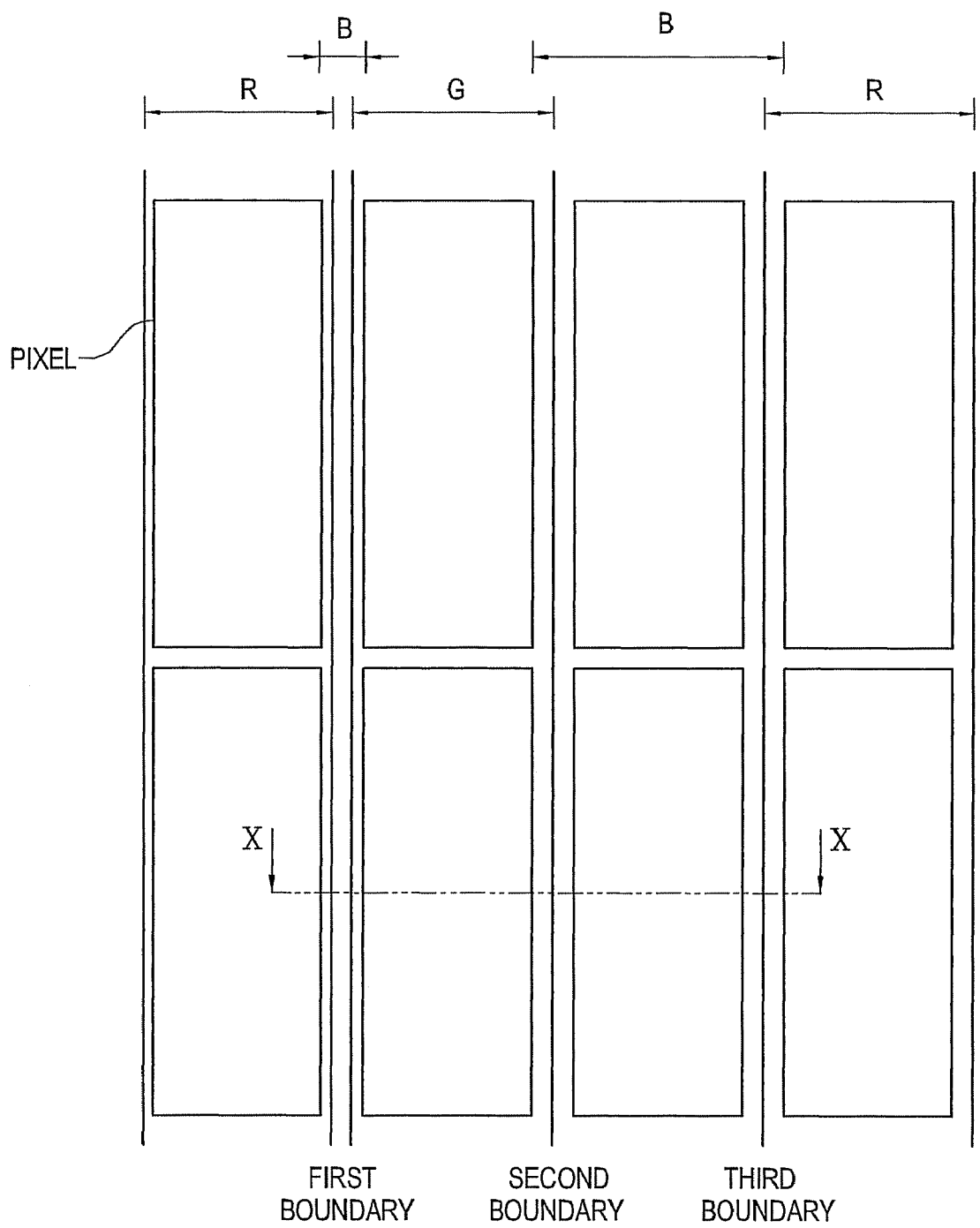
FIG. 9 is a top plan layout view schematically illustrating an arrangement of a color filter of the first exemplary embodiment of an LCD device according to the present invention.
Figure 10:
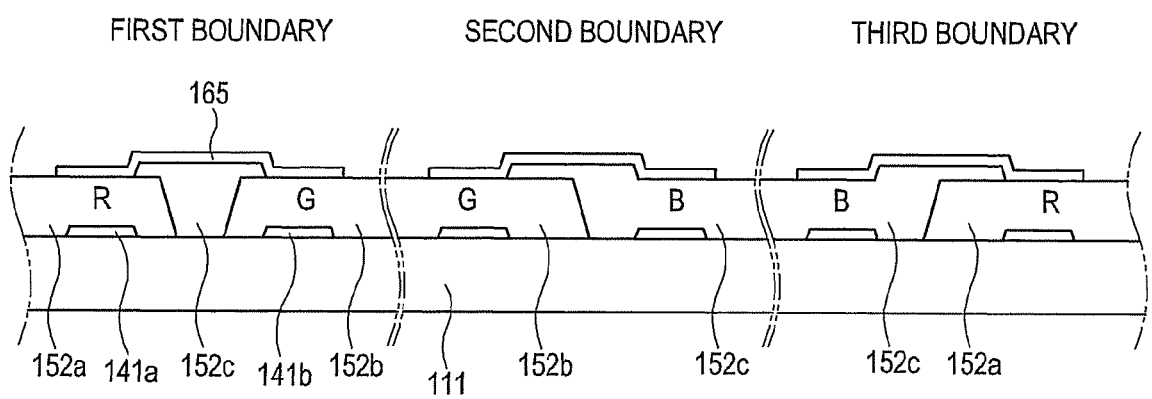
FIG. 10 is a cross-sectional view of the first exemplary embodiment of an LCD device according to the present invention, taken along line X-X in FIG. 9.

FIGS. 9 and 10 illustrate the color filter 152 arranged across several pixels to assist in understanding the first exemplary embodiment of the present invention.

The respective sub color filters 152a, 152b and 152c are formed substantially in the extension direction of the data line 141. The sub color filters 152a, 152b and 152c form the convex region A on the boundaries between the pixels along the data line 141, e.g., between the first data line 141a and the second data line 141b.

The first sub color filter 152a and the second sub color filter 152b are spaced apart from each other and the third sub color filter 152c forms the convex region A on the first boundary between the first sub color filter 152a and the second sub color filter 152b. The third sub color filter 152c overlaps both the first and second sub color filters 152a and 152b on the first boundary.

The third sub color filter 152c forms the convex region A on the second boundary between the second sub color filter 152b and the third sub color filter 152c. The third sub color filter 152c also forms the convex region A on the third boundary between the first sub color filter 152a and the third sub color filter 152c. The third sub color filter 152c overlaps the second sub color filter 152b on the second boundary and overlaps the first sub color filter 152a on the third boundary.

With such a configuration, most of the residual light which is emitted from the respective boundaries to the outside becomes the blue light. The blue light is substantially less visible to a user than non-colored light, thereby reducing problems due to the light leakage.

The method of manufacturing the first exemplary embodiment of an LCD device 1 according to the present invention will be described with reference to FIGS. 11A to 13C. FIGS. 11A to 13C illustrate an exemplary embodiment of a method of manufacturing the respective boundaries in the first substrate 100 of the first exemplary embodiment of an LCD device according to the present invention. Other parts of the first substrate 100 and the second substrate 200 of the first exemplary embodiment of an LCD device according to the present invention may be manufactured by any of several well-known methods, and thus the description thereof will be omitted.

Figure 11A:
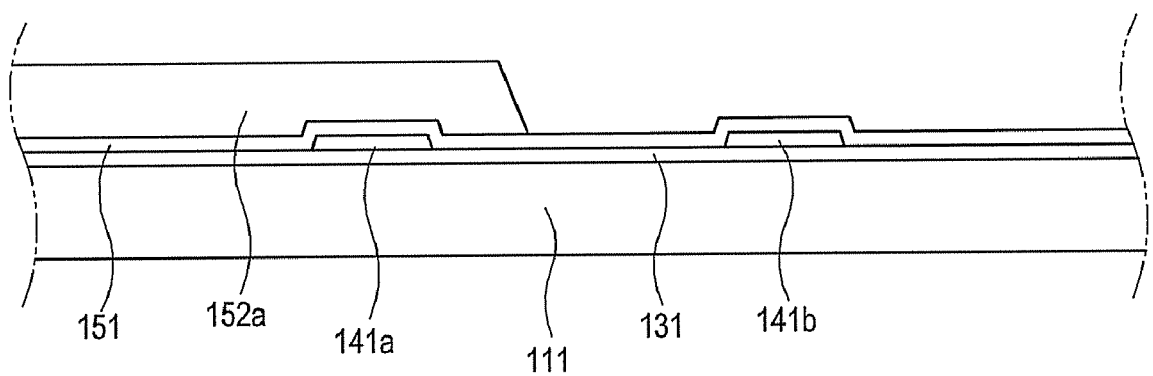
FIGS. 11A to 13C illustrate an exemplary embodiment of a method of manufacturing the first exemplary embodiment of an LCD device according to the present invention.
Figure 11B:
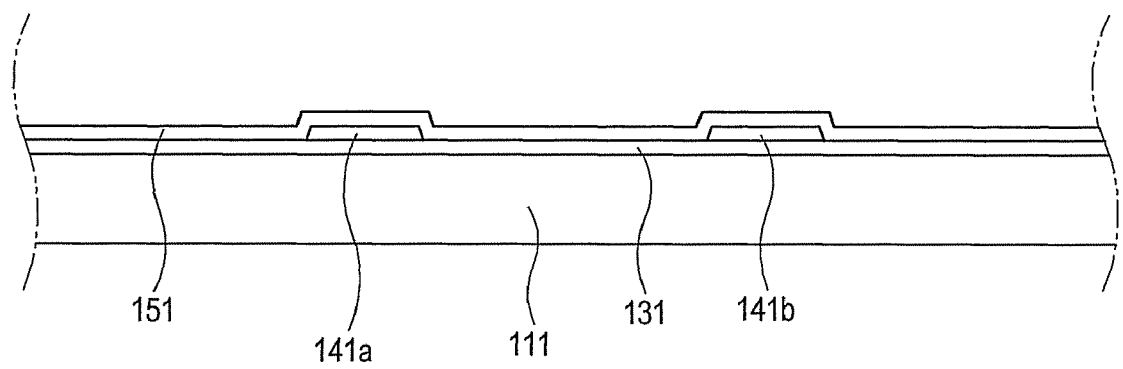
Figure 11C:
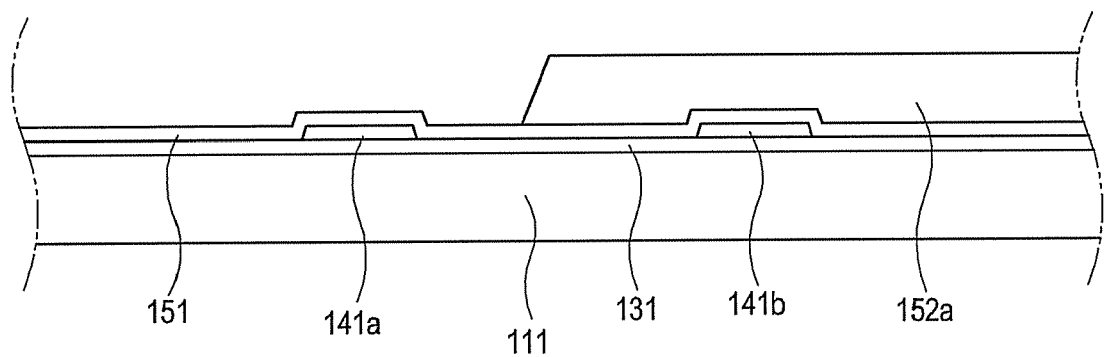
Figure 12A:
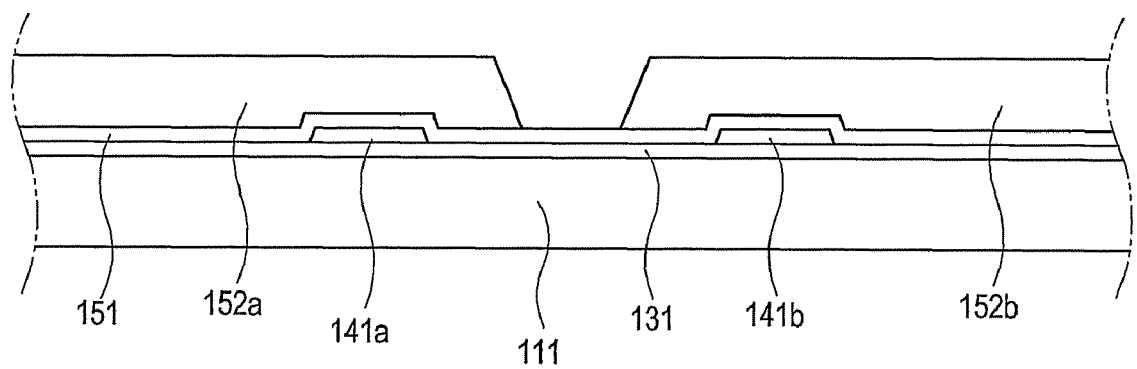
Figure 12B:
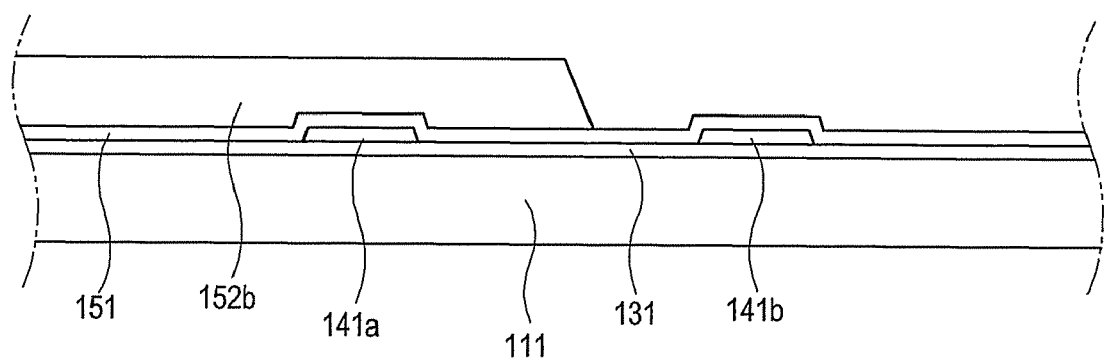
Figure 12C:
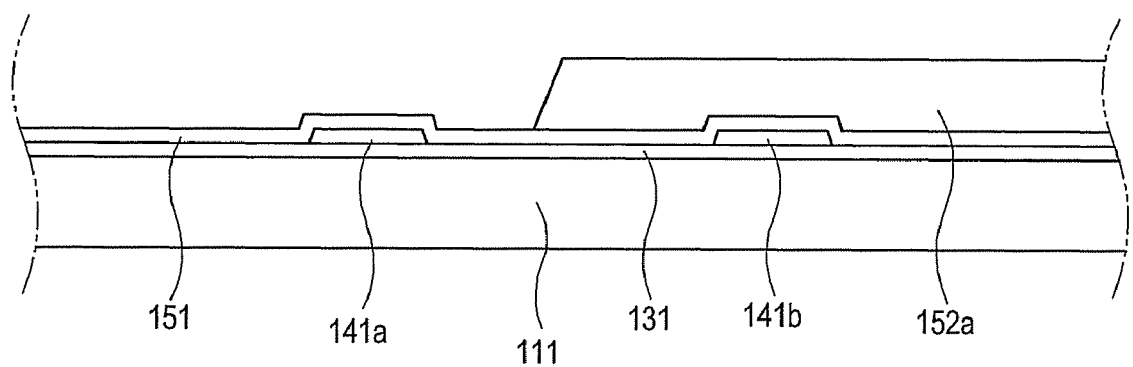
Figure 13A:
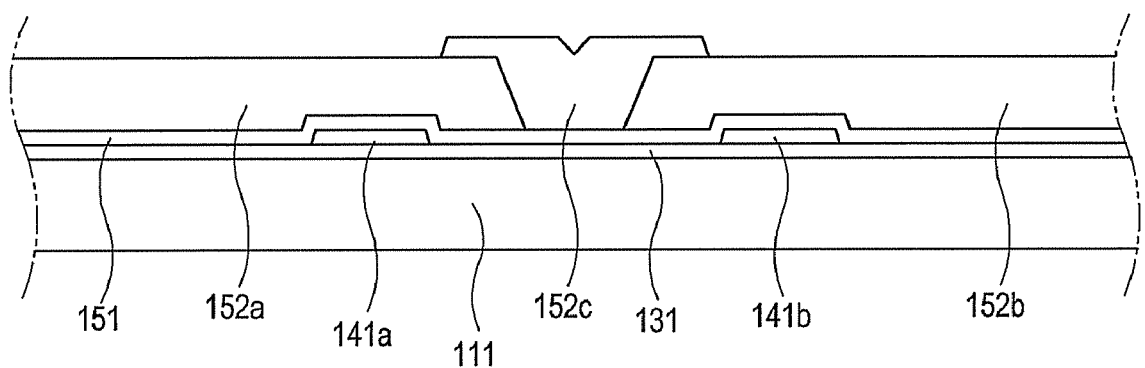
Figure 13B:
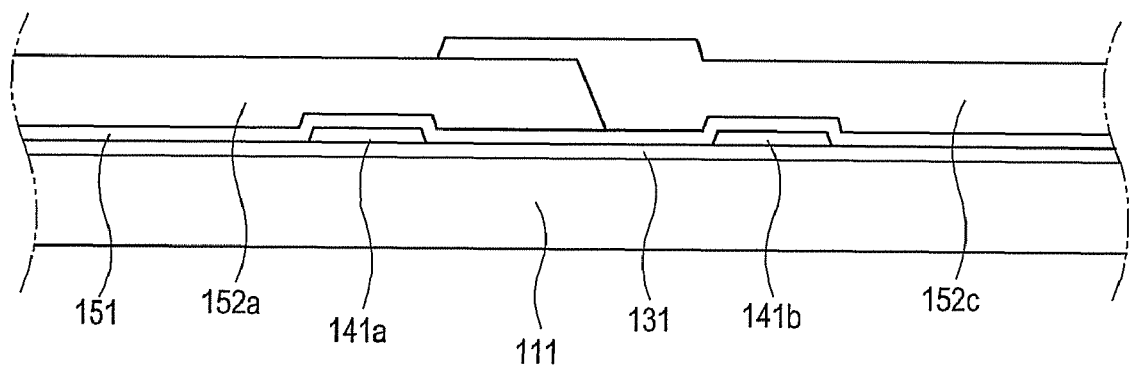
Figure 13C:
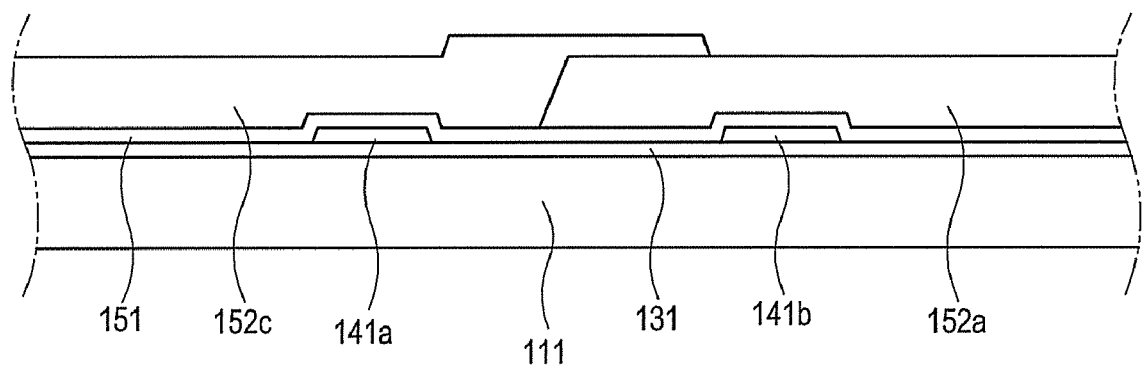

FIGS. 11A, 12A and 13A illustrate an exemplary embodiment of a method of manufacturing the first exemplary embodiment of an LCD device along the same cross-sectional view as shown in FIG. 6. FIGS. 11B, 12B and 13B illustrate an exemplary embodiment of a method of manufacturing the first exemplary embodiment of an LCD device along the same cross-sectional view as shown in FIG. 7. FIGS. 11C, 12C and 13C illustrate an exemplary embodiment of a method of manufacturing the first exemplary embodiment of an LCD device along the same cross-sectional view as shown in FIG. 8.

As shown in FIGS. 11A, 11B and 11C, the gate insulating layer 131 is formed on the first insulating substrate 111. The data lines 141a and 141b are formed on the gate insulating layer 131. The insulating layer 151 is then formed on the gate insulating layer 131 and the data lines 141a and 141b. The first sub color filter 152a is then formed on the insulating layer 151.

In one exemplary embodiment the first sub color filter 152a may be formed by coating and subsequently exposing and developing a red photosensitive layer. In one exemplary embodiment the first sub color filter 152a is formed with an inclination with respect to the first insulating substrate 111 on the first boundary. In one exemplary embodiment the first sub color filter 152a is angled towards the first data line 141a.

As shown in FIGS. 12A, 12B and 12C, the second sub color filter 152b is formed on the insulating layer 151.

In one exemplary embodiment the second sub color filter 152b may be formed by coating and subsequently exposing and developing a green photosensitive layer. In one exemplary embodiment the second sub color filter 152b is formed with an inclination with respect to the first insulating layer 111 on the first boundary. In one exemplary embodiment the second sub color filter 152b is angled toward the second data line 141b. Thus, the first sub color filter 152a and the second sub color filter 152b are spaced apart from each other.

As shown in FIGS. 13A, 13B and 13C, the third sub color filter 152c is formed on the insulting layer 151 and the first and second sub color filters 152a and 152b. In one exemplary embodiment the third sub color filter 152c may be formed by coating and subsequently exposing and developing a blue photosensitive layer.

A part of the third sub color filter 152c is formed on the first and second sub color filters 152a and 152b so as to form the convex region A on the respective ends of the first and second sub color filters.

The shield electrode 165 is formed on the convex region A to cover the first data line 141a and the second data line 141b, thereby forming the first exemplary embodiment of an LCD device 1 as shown in FIGS. 6 to 8.

In another exemplary embodiment, a first sub color filter 152a and a second sub color filter 152b may overlap each other below a third sub color filter 152c, instead of being spaced from each other on a first boundary.

Figure 14:
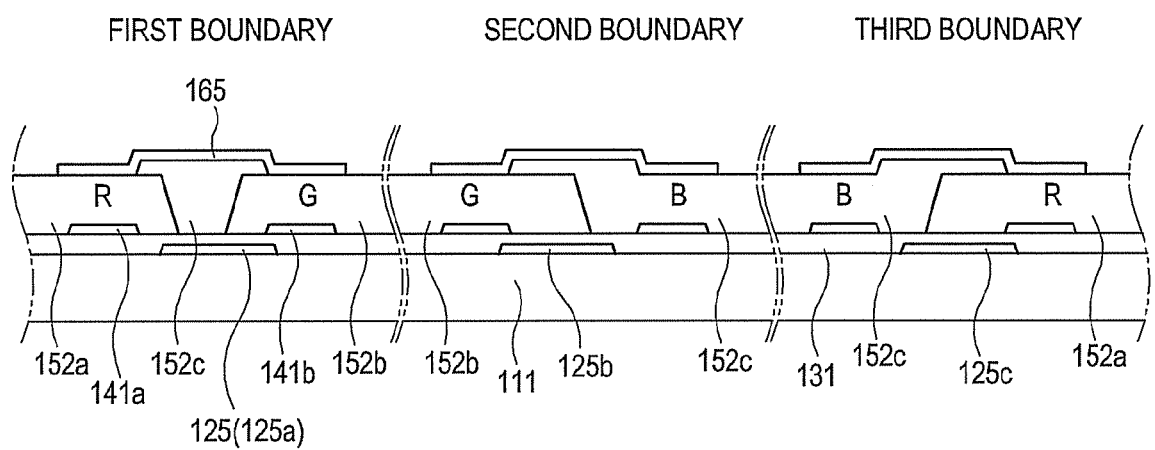
FIG. 14 is a cross-sectional view of a second exemplary embodiment of an LCD device according to the present invention, taken along line X-X in FIG. 9.

A second exemplary embodiment of an LCD device according to the present invention will be described with reference to FIG. 14. FIG. 14 is a cross-sectional view of the second exemplary embodiment of an LCD device, taken along line X-X in FIG. 9.

A light blocking layer 125 is formed on the first insulating substrate 111 in the region corresponding to the boundaries between the pixels. In one exemplary embodiment the light blocking layer 125 may be formed in the same layer as a gate line 121, and blocks light which is incident from a rear side of a first substrate 100 from passing through the boundaries between the pixels.

The light blocking layer 125 extends along a data line 141 and is in a floating state. That is, the light blocking layer 125 is not connected to a voltage source. Accordingly, the light blocking layer 125 is not connected to the gate line 121 and the data line 141. Each of the light blocking layers 125 partly overlaps one of a first data line 141a and a second data line 141b, but according to the present exemplary embodiment, does not overlap both of the first and second data lines 141a and 141b. That is, with respect to the gate line 121, a center point of the light blocking layer 125 is disposed closer to one of the first data line 141a and the second data line 141b and the thickness of the light blocking layer 125 along a direction substantially parallel to the gate line 121 is smaller than the separation between the first data line 141a and the second data line 141b.

As the light blocking layer 125 overlaps only one of the first data line 141a and the second data line 141b, a capacitor formed between the light blocking layer 125 and the data lines 141a and 141b is limited, and thus a signal transmission delay of the data lines 141a and 141b is significantly reduced or effectively prevented.

In another exemplary embodiment, a light blocking layer 125 may not overlap either the first data line 141a or the second data line 141b while being disposed therebetween. However, the present invention is not limited to the above-described exemplary embodiments and alternative exemplary embodiments include configurations wherein the light blocking layer 125 has various configurations.

The configuration and effect of a color filter 152 are substantially the same as those described above with respect to the first exemplary embodiment, and thus a repetitive description will be avoided here.

The light blocking layer 125 is disposed with a bias towards one side or the other of the respective boundaries, which will be described hereinafter.

A first light blocking layer 125a is positioned with its center point closer to the second data line 141b which is covered by a second sub color filter 152b on a first boundary and the thickness of the light blocking layer 125 along a direction substantially parallel to the gate line 121 is smaller than the separation between the first data line 141a and the second data line 141b.

Although some blue light may leak passed the first light blocking layer 125a and the data lines 141a and 141b, the light incident to the second sub color filter 152b is blocked by the first light blocking layer 125a, thereby efficiently preventing the green light, which is the most noticeable, from leaking. The blue light is not very visible to a user compared to the green light, thereby reducing or effectively preventing problems due to the light leakage.

A second light blocking layer 125b is positioned with its center point closer to the first data line 141a which is covered by the second sub color filter 152b on a second boundary. Although some blue light may leak passed the first light blocking layer 125a and the data lines 141a and 141b, the light incident to the second sub color filter 152b is blocked by the second light blocking layer 125b, thereby efficiently preventing the green light, which is most noticeable, from leaking. The blue light is not very visible to a user compared to the green light, thereby reducing or effectively preventing problems due to the light leakage.

A third light blocking layer 125c is positioned with its center point closer to the second data line 141b which is covered by the first sub color filter 152a on a third boundary and the thickness of the light blocking layer 125 along a direction substantially parallel to the gate line 121 is smaller than the separation between the first data line 141a and the second data line 141b.

Although some blue light may leak passed the first light blocking layer 125a and the data lines 141a and 141b, the light incident to the first sub color filter 152a is blocked by the third light blocking layer 125c, thereby efficiently preventing the red light from leaking. The blue light is not very visible to a user compared to the red light, thereby reducing or effectively preventing problems due to the light leakage.

Figure 15:
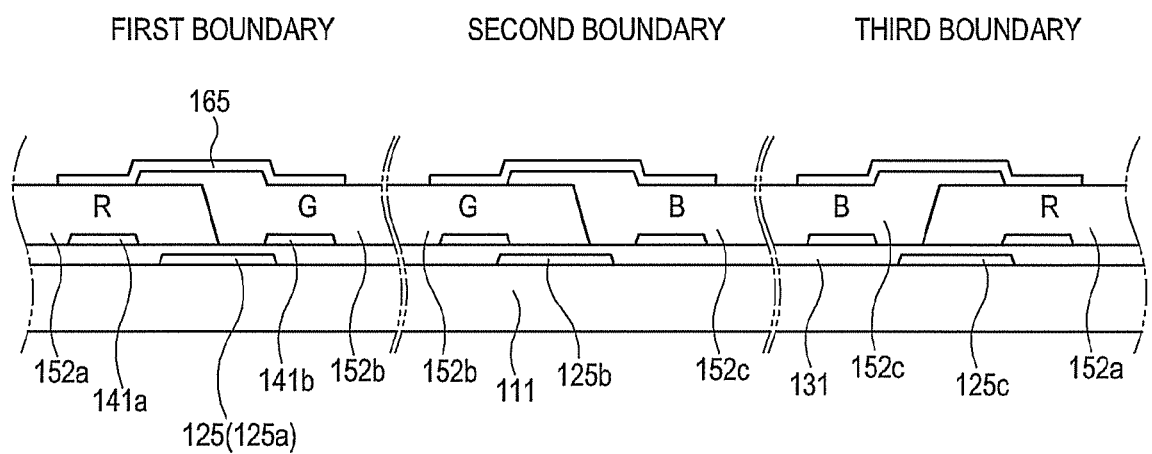
FIG. 15 is a cross-sectional view of a third exemplary embodiment of an LCD device according to the present invention.

A third exemplary embodiment of an LCD device according to the present invention will be described with reference to FIG. 15.

The configuration and effect of a light blocking layer 125 are the same as those described with respect to the second exemplary embodiment of an LCD device, and thus a repetitive description will be avoided here.

A second sub color filter 152b is formed on a first sub color filter 152a to form a convex region A on a first boundary. At least a portion of the first light blocking layer 125a is disposed on the region of the first insulating substrate 111 between the first data line 141a and the end portion of the first color filter layer 152a and therefore green light is prevented from leaking to the outside while only having passed through the green second color filter layer 152b.

The configuration of the color filter 152 on second and third boundaries is substantially the same as that in the second exemplary embodiment, and the repetitive description will be avoided here.

Figure 16:
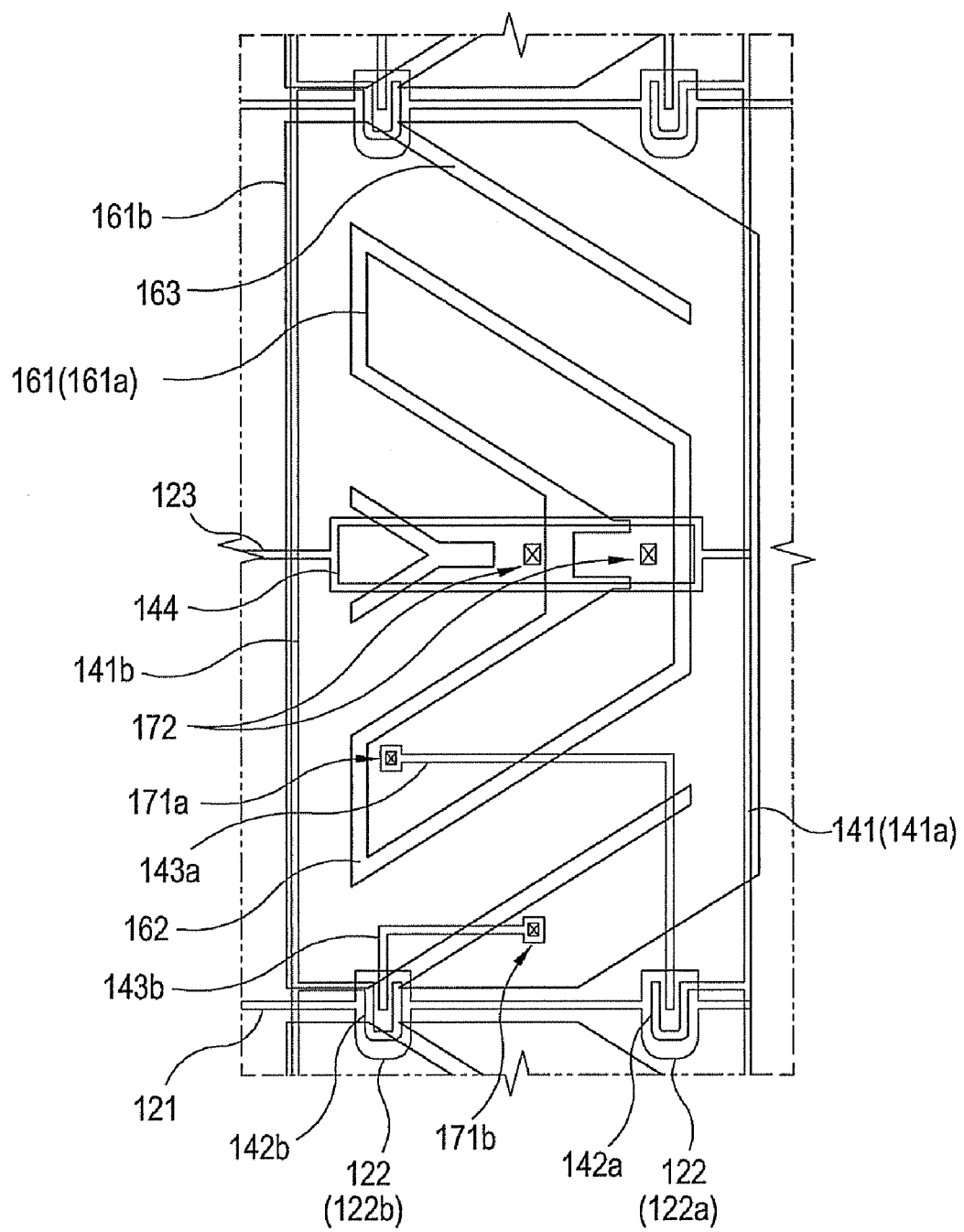
FIG. 16 is a top plan layout view illustrating a fourth exemplary embodiment of an LCD device according to the present invention.
Figure 17:
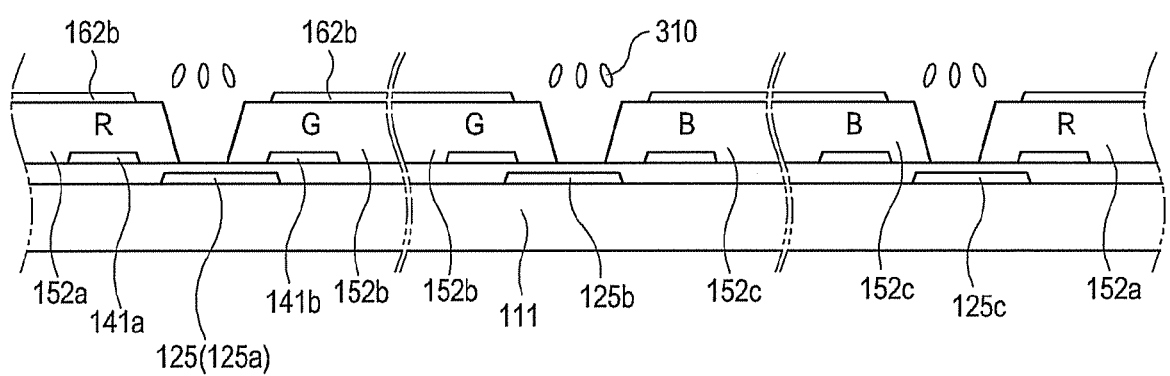
FIG. 17 is a cross-sectional view of three consecutive boundaries of the fourth exemplary embodiment of an LCD device according to the present invention.

A fourth exemplary embodiment of an LCD device according to the present invention will be described with reference to FIGS. 16 and 17. FIG. 17 is a cross-sectional view showing three consecutive boundaries of the fourth exemplary embodiment of an LCD device according to the present invention.

A second pixel electrode 161b is elongated in the direction of extension of a gate line 121 compared to that in the first exemplary embodiment. That is, a right side of the second pixel electrode 161b overlaps a first data line 141a while a left side thereof overlaps a second data line 141b.

In the present exemplary embodiment a shield electrode 165 is not formed. Sub color filters 152a, 152b and 152c are spaced apart from each other on respective boundaries, and a concavity is formed in the boundary between successive color filters 152. A pixel electrode 161 is not formed on the concave part, and therefore liquid crystal molecules 310 disposed on the concave part are not controlled by electrical fields created between the pixel electrode 162 and the common electrode 241.

The liquid crystal molecule 310 is aligned with different orientations on opposite sides of the concave part, thereby possibly leaking light incident thereto at a small angle of incidence. However, such light leakage may be blocked by the light blocking layer 125. The configuration of the light blocking layer 125 is the same as that described with respect to the second exemplary embodiment, and the repetitive description will be avoided here.

As described above, the present invention provides an LCD device which reduces problems caused by a light leakage.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A liquid crystal display device comprising:
a first substrate;
a second substrate facing the first substrate and having a common electrode; and
a liquid crystal layer disposed between the first substrate and the second substrate,
the first substrate comprising:
a plurality of pixels, each pixel being connected to a data line and a gate line;
a thin film transistor electrically connected to the data line and the gate line;
a pixel electrode electrically connected to the thin film transistor;
a color filter which includes a first sub color filter, a second sub color filter and a third sub color filter, each of the first, second and third sub color filters including a different color; and
a shield electrode which receives a common voltage and is disposed substantially parallel to the data line along a boundary between adjacent pixels on the color filter,
wherein the color filter disposed below the shield electrode comprises a convex region which protrudes toward the second substrate,
the plurality of pixels comprise a first pixel including the first sub color filter, a second pixel including the second sub color filter and a third pixel including the third sub color filter, and
the third sub color filter forms the convex region between the first sub color filter and the second sub color filter on a first boundary between the first pixel and the second pixel along the data line,
wherein, the shield electrode overlaps adjacent data lines and is disposed between adjacent pixel electrodes.

2. The liquid crystal display device according to claim 1, wherein the third sub color filter forms the convex region on a second boundary between the second pixel and the third pixel along the data line, and forms the convex region on a third boundary between the first pixel and the third pixel along the data line.

3. The liquid crystal display device according to claim 2, wherein the first sub color filter and the second sub color filter are spaced apart from each other with respect to the first boundary.

4. The liquid crystal display device according to claim 3, wherein the first sub color filter is a red color, the second sub color filter is a green color and the third sub color filter is a blue color.

5. The liquid crystal display device according to claim 4, wherein the thin film transistor comprises a first thin film transistor and a second thin film transistor, and
the pixel electrode comprises a first pixel electrode electrically connected to the first thin film transistor and a second pixel electrode separated from the first pixel electrode and is electrically connected to the second thin film transistor.

6. The liquid crystal display device according to claim 5, wherein the first thin film transistor and the second thin film transistor are connected to the same gate line.

7. The liquid crystal display device according to claim 6, wherein the data line comprises a first data line connected to the first thin film transistor and a second data line connected to the second thin film transistor.

8. The liquid crystal display device according to claim 7, wherein the pixel electrode comprises a pixel electrode cutting pattern, the common electrode comprises a common electrode cutting pattern, and the liquid crystal layer is configured in a vertical alignment mode.

9. The liquid crystal display device according to claim 7, wherein the shield electrode at least partially covers the first and second data lines.

10. The liquid crystal display device according to claim 7, wherein the shield electrode is disposed in substantially the same layer as the pixel electrode.

11. The liquid crystal display device according to claim 7, wherein the first substrate further comprises a light blocking layer disposed on the boundaries between the pixels along the data line.

12. The liquid crystal display device according to claim 11, wherein the light blocking layer is in a floating state.

13. The liquid crystal display device according to claim 12, wherein at least one of opposite end parts of the light blocking layer in an extension direction of the gate line is disposed between the first data line and the second data line.

14. The liquid crystal display device according to claim 12, wherein the light blocking layer is disposed on the first boundary with the center point closer to the second pixel.

15. The liquid crystal display device according to claim 12, wherein the light blocking layer is disposed on the second boundary with the center point closer to the second pixel.

16. The liquid crystal display device according to claim 12, wherein the light blocking layer is disposed on the third boundary with the center point closer to the first pixel.

17. The liquid crystal display device according to claim 12, wherein the light blocking layer is disposed in substantially the same layer as the gate line.

* * * * *